Patented Dec. 29, 1931

1,838,884

UNITED STATES PATENT OFFICE

WALTER E. TRENT, OF NEW YORK, N. Y., ASSIGNOR TO TRENT PROCESS CORPORATION, OF NEW YORK, N. Y., A CORPORATION OF DELAWARE

METHOD OF PRODUCING FUEL

No Drawing. Application filed November 26, 1929. Serial No. 409,976.

My invention relates to the manufacture of fuel or fuel briquettes and particularly has reference to a process of producing solid fuel in a practical and economical manner and which is accompanied by the recovery of by-product oil.

In my prior Patent No. 1,420,164 I have described and claimed a process of purifying coals and other carbonaceous materials by the removal therefrom of ash-forming or non-carbonaceous constituents. In accordance with the process of the patent the solid fuel or carbonaceous material is first pulverized in any suitable manner and the finely comminuted fuel suspended in water or other liquids. A treating agent comprising preferably fuel oil, gasoline, crude oil or benzol is then added to the water suspension of the coal or other carbonaceous material and the mixture agitated. By reason of this treatment, the ash-forming constituents and other impurities are removed from the coal and the carbon content thereof in finely divided form is agglomerated with the oil to form a purified coal-oil amalgam.

The present invention has for its object the production of fuel briquettes or shapes from pulverized coal or other solid carbonaceous material purified and agglomerated in a manner similar to that referred to above, preferably employing as the treating agent a relatively light oil.

It is a further object of my invention to recover as by-products of the briquette manufacture the oil employed as the treating agent in the purification and agglomeration of the coal and to utilize the residual heat of such recovery to form a residual oil binder for the coal particles in the briquetting.

Other objects and advantages of my invention will appear from the more detailed description of the process.

As stated, my process of briquette manufacture comprises the amalgamation and purification of finely divided coal with a relatively light oil; distilling the resulting amalgam to remove and recover the oil and to leave hot dry coal dust; adding to the coal dust while still hot a liquid binder, preferably a heavier oil such as fuel oil, whereby the volatile fractions of the binder are vaporized and recovered by the heat of the coal dust and an oil residue constituting an effective binder left in the coal dust; briquetting or shaping the resultant mixture of coal dust and residual oil binder; and coking or carbonizing to produce a solid fuel briquette as the final product of the process.

In the performance of my process, the coal or other solid carbonaceous material is first pulverized in any known manner, either by the wet or dry method, and the coal particles suspended in water as disclosed in my patent referred to. A relatively light oil treating agent such as gasoline, naphtha, kerosene, benzol, etc., is now added to the coal in water suspension and the mixture agitated, the treatment resulting in the removal of non-carbonaceous impurities from the coal and the formation of an amalgam as described in the patent. When employing benzol as a treating agent, one part of same to two parts of comminuted coal passed through a 100 mesh screen will suffice.

The amalgam having been separated from the bulk of the water, the same is now introduced to a closed retort and heated sufficiently to distill off the remaining water and the light oil treating agent and to reduce the finely divided coal to a dry condition. Temperatures of about 600° F. will usually be found adequate for such distillation. The hydrocarbon vapors resulting from the distillation are removed and condensed, the condensed oil constituting a by-product of the process and may be used as the purifying and agglomerating agent for additional quantities of coal.

To the dry coal dust remaining after distillation, while still in the heated condition and either in the same or another closed vessel, there is added a heavier hydrocarbon oil binder such as fuel oil, or residuum which upon partial vaporization by the heat of the coal leaves a residual hydrocarbon product which serves as a binder for the coal particles. As stated, the heat of the dry coal dust immediately following the distillation vaporizes the more volatile fractions of the binder oil, these fractions being condensed and recovered as a second by-product of the process, and the particles of coal then remain coated with an oil residue constituting an effective binder.

The resultant mixture of coal particles and residual oil binder is then briquetted or formed into desired shapes by means of any known form of briquetting apparatus, the residue of the partially distilled heavier oil intimately distributed throughout the carbonaceous material functioning effectively as a binder for the solid particles.

The briquettes or preformed coal masses are now ready for the final baking or carbonization operation, and although not essential, I prefer to carry out this part of the process in a manner similar to the carbonization method as described in my prior copending application Serial No. 234,261, filed November 18, 1927, for the production of strong, porous, smokeless and substantially flameless briquettes. According to the process of said application, the briquettes are first distilled at a temperature of approximately 500° F. to 600° F. in the presence of only limited amounts of air for removal of volatiles from the oil binder and coal and the partially distilled briquettes are then heated to higher temperatures in the presence of sufficient air to oxidize or "asphaltize" the residual oil binder whereby the latter is converted into an extremely hard carbon or coke-like material which imparts strength to the fuel and burns free of smoke and asphalt vapors.

In the present process, if the heat treatment of the coal and liquid binder before briquetting has been sufficient to eliminate the volatiles ordinarily removed in the first stage of the carbonization process referred to, this first stage may be eliminated and the briquettes passed directly to the second stage of the process for heating with air to oxidize or asphaltize the residual oil binder.

From the foregoing it will be seen that I have devised an efficient and economical process for producing solid fuel and for recovering certain valuable by-products formed in the process. Variations and modifications may be made in the process without departing from the scope and spirit of the invention as defined in the appended claims.

Having thus described my invention, what I claim is:

1. A method of producing fuel which comprises forming solid carbonaceous material into an amalgam with relatively light hydrocarbon oil in the presence of water thereby excluding ash-forming constituents from the amalgam, distilling the amalgam and recovering evolved vapors of the light oil, adding to the distillation residue while still hot a heavier hydrocarbon oil and recovering evoved vapors, molding the resultant mixture of solid carbonaceous material and residue of the heavier oil into desired shapes and carbonizing said shapes.

2. A fuel producing process which comprises amalgamating coal with oil in the presence of water to separate ash-forming constituents from the coal, distilling the resultant coal and oil amalgam, removing and condensing evolped vapors, adding to the distillation residue while still hot a liquid oil binder to thereby vaporize the more volatile fractions of said binder and form an oil residue in said distillation residue, forming the resultant mixture into briquettes, and carbonizing the briquettes.

3. A fuel producing process which comprises amalgamating coal with oil in the presence of water to separate ash-forming constituents from the coal, distilling the resultant coal and oil amalgam, removing and condensing evolved vapors, adding to the distillation residue while still hot a liquid oil binder to thereby vaporize the more volatile fractions of said binder and form an oil residue in said distillation residue, forming the resultant mixture into briquettes, and carbonizing the briquettes in the presence of air to thereby oxidize said oil residue.

4. In the production of fuel, the steps which comprise distilling the coal and oil amalgam resulting from the purification of comminuted coal by treatment in water suspension with a hydrocarbon oil treating agent, condensing the evolved hydrocarbon vapors, adding a liquid oil binder to the distillation residue while still hot to thereby deposit an oil residue therein, forming the resultant mixture into fuel masses, and carbonizing said masses.

5. A fuel producing process which comprises purifying finely divided coal and separating non-carbonaceous constituents therefrom by amalgamating the coal with a relatively light hydrocarbon oil in the presence of water, separating the resultant coal and oil amalgam and distilling the same to remove light oil vapors, removing and condensing the vapors, adding to the distillation residue while hot a heavier hydrocarbon oil to deposit an oil residue binder in said distillation residue, and forming the admixed distillation residue and binder into desired shapes.

6. A fuel producing process which comprises purifying finely divided coal and separating non-carbonaceous constituents therefrom by amalgamating the coal with a relatively light hydrocarbon oil in the presence of water, separating the resultant coal and oil amalgam and distilling the same to remove light oil vapors, removing and condensing the vapors, utilizing the condensed light oil vapors in the amalgamation of additional quantities of finely divided coal as aforesaid, adding to the distillation residue while hot a heavier hydrocarbon oil to deposit an oil residue binder in said distillation residue, and forming the admixed distillation residue and binder into desired shapes.

In testimony whereof I affix my signature.

WALTER E. TRENT.